Dec. 31, 1963  J. S. WITHERS  3,116,389
PROTECTORS FOR ELECTRIC CIRCUITS
Filed June 22, 1961  3 Sheets-Sheet 1
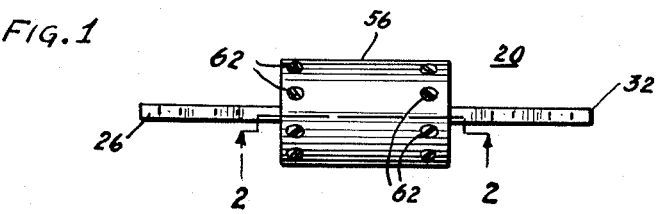
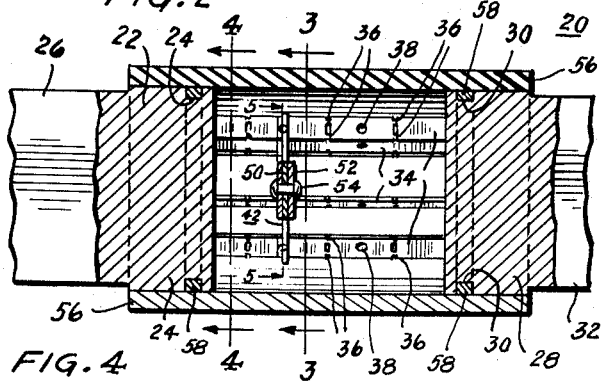
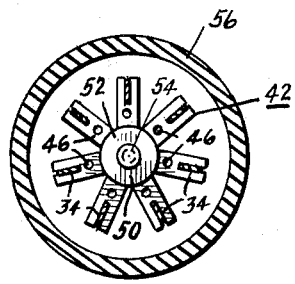
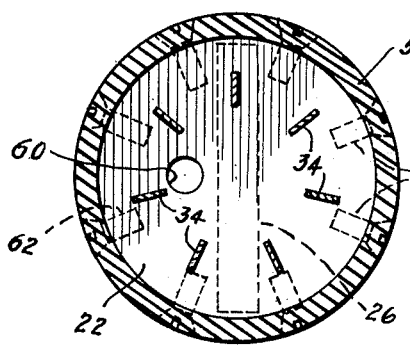
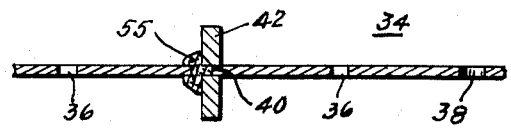
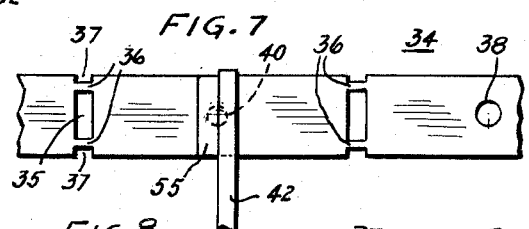
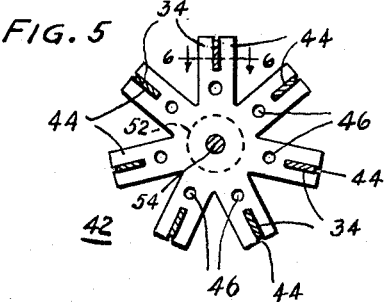
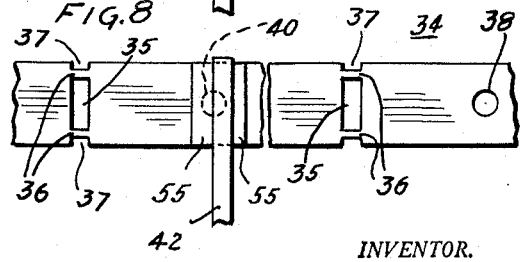
INVENTOR.
JOHN S. WITHERS
BY  Rey Eilers,
ATTY.

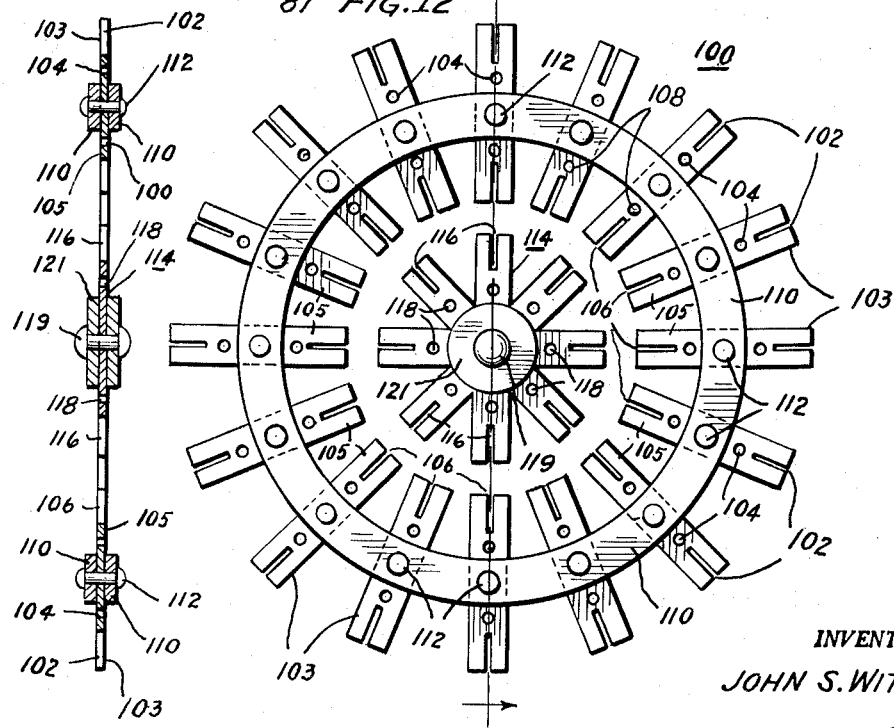

Dec. 31, 1963
J. S. WITHERS
3,116,389
PROTECTORS FOR ELECTRIC CIRCUITS
Filed June 22, 1961
3 Sheets-Sheet 3
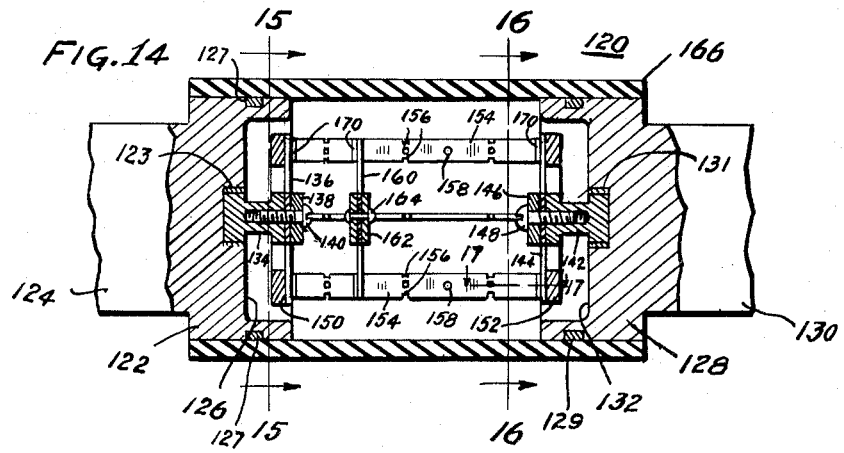
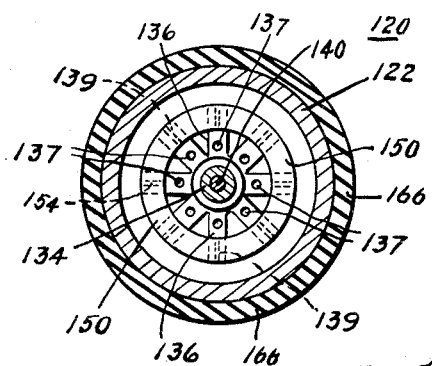
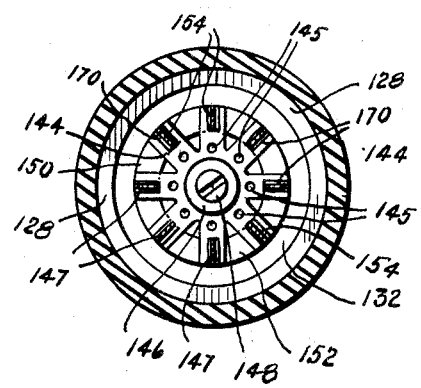
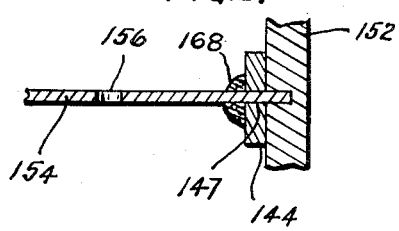
INVENTOR.
JOHN S. WITHERS
BY Rey Eilers
ATT'Y.

United States Patent Office 3,116,389
Patented Dec. 31, 1963

3,116,389
PROTECTORS FOR ELECTRIC CIRCUITS
John S. Withers, Dellwood, Mo., assignor to McGraw-Edison Company, Elgin, Ill., a corporation of Delaware
Filed June 22, 1961, Ser. No. 118,833
18 Claims. (Cl. 200—131)

This invention relates to improvements in protectors for electric circuits. More particularly, this invention relates to improvements in electric fuses.

It is, therefore, an object of the present invention to provide an improved electric fuse.

Electric fuses should respond to overloads in the short circuit range to "open" promptly and thereby protect the circuits in which they are incorporated. Yet, those fuses should be capable of "carrying" overloads, below the short circuit range, for finite, predetermined periods of time. For example, electric fuses that are incorporated in motor circuits should be capable of carrying the starting currents of the motors until those motors get up to normal operating speed. In recognition of this fact, a number of "time lag" fuses have been proposed, and some of those time lag fuses have been produced commercially. The fuse provided by the present invention is an improved time lag fuse; and it is, therefore, an object of the present invention to provide an improved time lag fuse.

The fuse provided by the present invention has end bells and has fusible conductors which are secured to and which extend between those end bells. Those fusible conductors have "weak spots" of very limited cross section, and hence those fusible conductors will be able to open promptly when overloads in the short circuit range are applied to the fuse. The fuse provided by the present invention also has a large heat-absorbing mass; and that heat-absorbing mass is connected to those fusible conductors in such a way as to enable that heat-absorbing mass to absorb heat from those fusible conductors while enabling that heat-absorbing mass to be physically displaced from those fusible conductors. The fact that the heat-absorbing mass will absorb heat from the fusible conductors enables those conductors to carry overloads, below the short circuit range, for finite, predetermined periods of time; and the fact that the said heat-absorbing mass is physically displaced from those fusible conductors keeps any arcs, that form when those fusible conductors open, from volatilizing the said heat-absorbing mass and thereby avoids the generation of heavy pressures within the housing for the fuse. The overall result is that the fuse provided by the present invention can provide very rapid opening of the circuit, in which it is incorporated, when that circuit is subjected to overloads in the short circuit range, can carry overloads below the short circuit range or finite, predetermined periods of time, and can avoid volatilization of the heat-absorbing mass therein. It is, therefore, an object of the present invention to provide a fuse with fusible conductors and with a heat-absorbing mass which is connected to those fusible conductors in such a way as to enable that heat-absorbing mass to absorb heat from those fusible conductors while enabling that heat-absorbing mass to be physically displaced from those fusible conductors.

The heat-absorbing mass, in the fuse provided by the present invention, is supported by a spider of heat-conductive material; and the fingers of that spider are connected to and supported by the fusible conductors of that fuse. Those fingers laterally displace the heat-absorbing mass from the fusible conductors but readily conduct heat from those fusible conductors to that heat-absorbing mass; and that conduction of heat delays the opening of the fuse. When, however, the amount of heat that is generated by the fusible conductors becomes sufficiently great, the fingers of the spider will be unable to conduct sufficient heat to the heat-absorbing mass to keep the fusible conductors from fusing; and thereupon the fuse will open and protect the circuit. It is, therefore, an object of the present invention to provide a fuse wherein a heat-absorbing mass is supported by a spider of heat-conductive material and wherein the fingers of the spider are connected to and are supported by the fusible conductors of that fuse.

The fingers of the spider have weak spots therein, and those weak spots are intermediate the fusible conductors and the heat-absorbing mass. Those weak spots will remain intact as long as the fusible conductors of the fuse remain intact, because those fingers will be connected to equi-potential points on the fusible conductors and will thus conduct little or no current. However, if those fingers begin to carry current, as they will do in the event some of the fusible conductors fuse in advance of the fusing of the rest of the fusible conductors, the weak spots of the fingers will fuse. In this way, the fingers of the spider and the heat-absorbing mass experience little or no current flow as long as the fusible conductors are intact, and the heat-absorbing mass experiences only a little current flow when the fusible conductors fuse. This is desirable because it keeps the heat-absorbing mass from becoming heated to the point where it could volatilize and create heavy pressures within the housing for the fuse.

The connections between the fusible conductors and the fingers of the spider are made intimate by masses of alloying material. Those masses assure efficient transference of heat from the fusible conductors to those fingers; and those masses also enable the fusible conductors to open the circuit when the temperatures of those masses reach the alloying temperature of those masses. Those masses will not be able to reach that alloying temperature immediately, even in the presence of substantial overloads, because the fingers of the spider will conduct heat away from those masses and to the heat-absorbing mass. Only after the heat-absorbing mass reaches a temperature close to that alloying temperature, will the alloying masses be able to provide a substantial alloying action. In this way, the present invention prevents the initiation of substantial alloying action until an overload has been continued for a predetermined period of time, and will thereafter permit that alloying action to occur. It is, therefore, an object of the present invention to provide masses of alloying material at the junctions of the fusible conductors and the fingers of the spider in a time delay fuse.

When the fuse provided by the present invention is subjected to overloads in the short circuit range, there will not be sufficient time for the heat generated in the fusible conductors to flow through the fingers of the spider and into the heat-absorbing mass. As a result, the fuse provided by the present invention will act as a current-limiting fuse and will promptly open the circuit whenever that circuit is subjected to overloads in the short circuit range.

In connecting the fingers of the spider to the fusible conductors, it would seem logical to connect those fingers to those fusible conductors at the thermal centers of those conductors. Such an arrangement would enable the fingers to transfer large quantities of heat to the heat-absorbing mass, because those fingers would be located at the hottest part of the fuse. Furthermore, such an arrangement would make certain that the masses of alloying material would be raised to high temperatures. However, despite the logical nature of that arrangement, that arrangement is not desirable. Instead, it is desirable to space those fingers and the alloying masses substantial distances from the thermal centers of the fusible conductors. It is, therefore, an object of the present invention to space the fingers of the spider and the alloying masses away from the thermal centers of the fusible conductors.

Other and further objects and advantages of the present invention should become apparent from an examination of the drawing and accompanying description.

In the drawing and accompanying description, several preferred embodiments of the present invention are shown and described, but it is to be understood that the drawing and accompanying description are for the purpose of illustration only and do not limit the invention and that the invention will be defined by the appended claims.

In the drawing,

FIG. 1 is a plan view of one embodiment of electric fuse that is made in accordance with the principles and teachings of the present invention, FIG. 2 is a sectional view, on a larger scale, through the fuse of FIG. 1, and it is taken along the broken plane indicated by the broken line 2—2 in FIG. 1, FIG. 3 is a sectional view through the fuse of FIG. 1, and it is taken along the plane indicated by the line 3—3 in FIG. 2, FIG. 4 is a sectional view, on a still larger scale, through the fuse of FIG. 1, and it is taken along the plane indicated by the line 4—4 in FIG. 2, FIG. 5 is a sectional view, on the scale of FIG. 4, through the fuse of FIG. 1, and it is taken along the plane indicated by the line 5—5 in FIG. 2, FIG. 6 is a sectional view, on an even larger scale, through the structure shown in FIG. 5, and it is taken along the plane indicated by the line 6—6 in FIG. 5, FIG. 7 is an elevational view of the structure shown in FIG. 6, FIG. 8 is an elevational view of the structure shown in FIG. 7 after the fusible conductor has opened on a long-continued overload, FIG. 9 is a sectional view through another embodiment of electric fuse that is made in accordance with the principles and teachings of the present invention, FIG. 10 is a sectional view, on a larger scale, through the fuse of FIG. 9, and it is taken along the plane indicated by the line 10—10 in FIG. 9, FIG. 11 is a partially-sectioned, elevational view, on a much larger scale, through one of the fusible conductors of the fuse in FIG. 9 after that fusible conductor has blown on short circuit, FIG. 12 is an elevational view of a ring-like spider and of a star-like spider which are usable in another embodiment of electric fuse that is made in accordance with the principles and teachings of the present invention, FIG. 13 is a sectional view through the spiders of FIG. 12, and it is taken along the plane indicated by the line 13—13 in FIG. 12, FIG. 14 is a sectional view through still another embodiment of electric fuse that is made in accordance with the principles and teachings of the present invention, FIG. 15 is a sectional view through the fuse of FIG. 14, and it is taken along the plane indicated by the line 15—15 in FIG. 14, FIG. 16 is a sectional view through the fuse of FIG. 14, and it is taken along the plane indicated by the line 16—16 in FIG. 14, and FIG. 17 is a sectional view, on a much larger scale, through part of the fuse of FIG. 14, and it is taken along the plane indicated by the line 17—17 in FIG. 14.

Referring to the drawing in detail, the numeral 20 generally denotes one form of electric fuse that is made in accordance with the principles and teachings of the present invention. That fuse has a generally cylindrical end bell 22 which has an annular groove 24 in the periphery thereof. A terminal that is flat and is rectangular is denoted by the numeral 26, and that terminal extends to the left from the end bell 22. That end bell and that terminal can be made integral by a casting operation or by a fabricating operation. The numeral 28 denotes the other end bell of the fuse 20, and that end bell is substantially identical to the end bell 22—having an annular groove 30 and having a flat, rectangular terminal 32. However, the end bell 22 has an opening 60 therein; and the end bell 28 may or may not have such an opening.

The numeral 34 generally denotes fusible conductors that extend between and are fixedly secured to the end bells 22 and 28. Preferably, the ends of the fusible conductors 34 will be seated in sockets in the confronting faces of the end bells 22 and 28 and will be held in those sockets by high melting point solder. The fusible conductors 34 can be made of different metals, but will preferably be made of silver. Each of the fusible conductors has a number of weak spots 36 therein, and those weak spots are formed by providing central slots 35 and inwardly-extending notches 37, as indicated particularly by FIG. 7. The weak spots 36 are paired, and the paired weak spots have sufficient cross sectional areas to carry the rated currents of the fusible conductors indefinitely. However, those weak spots will respond to overloads to generate increased amounts of heat, and they can respond to overloads in the short circuit range to fuse promptly and open the circuit.

Each of the fusible conductors 34 has a circular opening 38 therein and has a second opening 40 therein. As indicated particularly by FIG. 2, each of the openings 38 is disposed between two sets of weak spots 36, and each of the openings 40 is disposed between two sets of weak spots 36. If desired, the openings 38 could be eliminated. The openings 40 are spaced from the longitudinal centers of the fusible conductors 34; and this is important because those longitudinal centers will be the thermal centers of the fusible conductors, and the openings 40 should be spaced from those thermal centers.

The numeral 42 generally denotes a spider which has a number of fingers projecting radially outwardly from the center thereof. In the particular embodiment shown, seven fingers are provided for the spider 42. Radially-extending slots 44 are provided in those fingers adjacent the outer ends thereof, and those slots are dimensioned to accommodate the fusible conductors 34. Openings 46 are provided in the fingers of the spider 42, and those openings as disposed radially inwardly of the slots 44. The portions of the fingers of the spider 42 which define the openings 46 are large enough to transmit heat from the slotted ends of those fingers to the center of that spider, but are small enough to fuse in the event the rated current of the fuse passes through those portions of that spider.

The spider 42 has a central opening therein, and that opening is set in register with central openings in circular discs 50 and 52. Those discs are preferably made from a metal that is a good conductor of heat, so they can rapidly absorb heat from the spider 42. Metals such as copper or silver are preferred. The discs 52 and 50 are fixedly held in intimate engagement with the central portion of the spider 42 by a rivet 54; that rivet being telescoped through alined openings in the discs 50 and 52 and in the central portion of the spider 42 and then being riveted over. The rivet 54 will assure the maintenance of an intimate heat-exchanging engagement between the central portion of the spider 42 and the central portions of the discs 50 and 52; but, if desired, high melting point solder can be applied to the central portion of the spider 42 and to the discs 50 and 52 to increase the efficiency of the heat exchange between that spider and those discs. Those discs will serve to absorb heat from the central portion of the spider 42.

Alloying material 55, as for example tin, is applied to the fusible conductors 34 adjacent the fingers of the spider 42, and that material may fill the openings 40. That alloying material is preferably applied to the fusible conductors 34 at just one face of the spider 42; and that one face should be that face of that spider which is closest to an adjacent end bell of the fuse. In the particular embodiment shown, the alloying material 55 is applied to the fusible conductors 34 at that face of the spider 42 which confronts the end bell 22. Such an arrangement is desirable because it makes certain that any heat flowing from the central portions of the fusible conductors 34 will reach the spider 42 at least as soon as it reaches the alloying material 55. The alloying material 55 assures efficient heat exchange between the fusible conductors and the fingers of the spider 42; and it also can respond to increases in the temperature thereof to alloy with the fusible conductors 34.

The fusible conductors 34 are not strong individually, but they will coact with each other to hold the end bells 22 and 28 in spaced relation during the assembling of the fuse 20. Further, the spider 42 will help stiffen and reinforce those fusible conductors.

The numeral 56 denotes a cylindrical housing for the fuse 20; and that housing is preferably made of a heat-resistant, dimensionally-stable, insulating material. One such material is glass melamine. The inner diameter of the housing 56 is just slightly larger than the outer diameters of the end bells 22 and 28; and, as a result, those end bells telescope snugly into the opposite ends of the housing 56. Resilient seals 58, as for example O-rings, are disposed within the grooves 24 and 30, respectively, of the end bells 22 and 28; and those resilient seals engage the inner face of the housing 56 and provide air-tight seals between the end bells and that housing. Radially-directed, threaded sockets are provided in the end bells 22 and 28, and those threaded sockets are in register with radially-directed openings in the housing 56; and fasteners 62, shown as screws, extend through those openings and seat in those sockets. Those fasteners fixedly secure the end bells 22 and 28 to the housing 56; and thus enable that housing to rigidly hold the end bells against movement relative to each other or relative to the fusible conductor 34.

The opening 60 in the end bell 22 permits arc-quenching filler to be introduced into the space defined by the housing 56 and the end bells 22 and 28. Once that space has been filled with arc-quenching filler, a plug can be set in position within the opening 60 to seal that opening.

The terminals 26 and 32 will be secured to bus bars or to other suitable current-conducting members. Current supplied to those bus bars or other current-conducting members will flow through the terminal 26, through the end bell 22, through the parallel-connected fusible conductors 34 into the end bell 28, and then through the terminal 32. As long as the current passing through the fusible conductors 34 is the rated current of the fuse 20, those fusible conductors will be able to carry that current indefinitely; because the end bells 22 and 28 and the terminals 26 and 32 will absorb enough heat from those fusible conductors to keep them from fusing.

If small, but potentially hurtful, overloads are applied to the fuse 20, the weak spots 36 will generate greater amounts of heat; but the end bells 22 and 28 and the terminals 26 and 32 will absorb enough heat from the fusible conductors 34 to delay the fusing of those fusible conductors. However, before such overloads could begin to become hurtful, the temperatures of the fusible conductors 34 would rise to levels at which alloying would take place, with consequent interruption of the circuit.

If moderate overloads are applied to the fuse 20; the weak spots 36 will generate still greater amounts of heat; and the rate of heat transference from the weak spots to the end bells 22 and 28 will be too slow to enable those end bells to provide the desired delay in the fusing of the fusible conductors 34. That delay will, however, be provided by the discs 50 and 52, because those discs are immediately adjacent the alloying masses 55. The discs 50 and 52 will limit the rate, at which the temperatures of the alloying masses 55 can rise, to such an extent that if the overload is transient in nature and passes quickly, the temperatures of the alloying masses 55 will not be able to rise to the point where any appreciable alloying action occurs. Depending upon the values of the overloads and depending upon the durations of the overloads, alloying action need not occur even though a succession of overloads occurs.

If a moderate overload continues for a predetermined length of time, the discs 50 and 52 will be unable to keep the temperatures of the alloying masses 55 down; and those masses will then begin to alloy with the metal of the fusible conductors 34. The resulting alloying action will increase the resistivities of those portions of the fusible conductors which are adjacent the openings 40; and hence the amount of heat generated by those portions will increase. That increased heat will foster further alloying action; and, very promptly, those portions of the fusible conductors 34 will rise to fusing temperature and will open. As the fusible conductors 34 are about to open the circuit, small parts of the masses 55 may work through the slots 44, as indicated by FIG. 8.

If all of the fusible conductors were to open at the same time, due to alloying action, no current would flow through the fingers of the spider 42. However, the fusible conductors 34 may not all open at the same time; and, where that is the case, current will usually flow through one or more of the fingers of the spider 42. Such current flow will heat the portions of those fingers which define the openings 46 and will promptly cause those portions to fuse. This fusing action is desirable because it keeps the central portion of the spider 42 and the discs 50 and 52 from being heated sufficiently to volatilize. If the metal of those discs or of the central portion of the spider 42 were to be permitted to volatilize, sufficiently heavy pressures could be generated within the housing 56 to cause that housing to become ruptured.

In the event overloads in the short circuit range are applied to the fuse 20, the heat generated by the weak spots 36 will be generated so rapidly that there will not be time for the fingers of the spider 42 to conduct any appreciable portion of that heat to the discs 50 and 52. Instead, the weak spots 36 will very quickly rise to their fusing temperatures and will open the circuit. In the event any arcs form between the unfused portions of the fusible conductors 34, those arcs will be unable to cause volatilization of the heat-absorbing discs 50 and 52, because those heat-absorbing discs are displaced laterally from the fusible conductors 34. As a result, there is no chance for arcs within the fuse 20 to cause volatilization of the metal of the heat-absorbing discs 50 and 52 or of the central portion of the spider 42.

As indicated previously herein, arc-quenching filler will fill the space defined by the housing 56 and the end bells 22 and 28. That filler will be introduced through the opening 60 while the fuse 20 is standing on the terminal 32, and that filler will surround and engage the fusible conductors 34. To facilitate a clear showing of the various components of the fuse 20, FIGS. 2–4 show that fuse before the arc-quenching filler has been introduced through the opening 60.

Because the openings 40 may be filled with alloying material 55, the portions of the fusible conductors 34 which define those openings may not generate appreciable portions of heat. The principal functions of the openings 40 are to facilitate the securement of the alloying material to the fusible conductors 34 and to the fingers of the spider 42, and to facilitate the quenching of any arcs which might form and which tended to burn those portions of the fusible conductors 34 that are intermediate those openings and the end bell 22.

FIG. 9 discloses another electric fuse that is made in accordance with the principles and teachings of the present invention; and that fuse is denoted generally by the numeral 66. That fuse has an end bell 68 with an annular groove 70 in the periphery thereof, and that end bell is equipped with a flat, rectangular terminal 72. The fuse 66 has an end bell 74 which is substantially identical to the end bell 68—having an annular groove 76 in the periphery thereof and being equipped with a flat, rectangular terminal 78. A number of fusible conductors 80 extend between and are secured to the confronting faces of the end bells 68 and 74. The ends of those fusible conductors are preferably seated in sockets in those confronting faces; and those ends are suitably held in those sockets by high melting point solder. The fusible conductors 80 are substantially identical to the fusible conductors 34—having weak spots 82 defined by central slots and by inwardly-extending notches and having openings 84 and 85. The weak spots 82 are substantially identical to the weak spots 36, and the openings 84 and 85 are, respectively, substantially identical to the openings 38 and 40.

The numeral 86 generally denotes a spider which is similar to the spider 42—having slots in the ends of the fingers thereof to accommodate fusible conductors. The spider 86 has a central opening which accommodates a rivet 90, and that rivet fixedly secures circular metal discs 88 to the opposite faces of the central portion of that spider. The spider 86 differs from the spider 42 in that it has just four fingers, as shown particularly by FIG. 10. Openings 89 are formed in the fingers of the spider 86, annd those openings are substantially identical to the openings 46 in the spider 42.

The numeral 92 denotes fusible conductors which are substantially identical to the fusible conductors 80—those fusible conductors having weak spots 82 and having openings 84 and 85. The fusible conductors 92 are secured to and extend between the confronting faces of the end bells 68 and 74; and the ends of those fusible conductors are preferably seated in sockets in those confronting faces. Those ends are held in those sockets by high melting point solder.

The numeral 94 generally denotes a spider which is identical to the spider 86—having four fingers, having slots in the ends of those fingers, and having openings 89 in those fingers. However, the spider 94 is displaced forty-five degrees from the position occupied by the spider 86, as shown particularly by FIG. 10. That displacement makes it possible for the slots in the ends of the fingers of spider 94 to accommodate the fusible conductors 92 while the slots in the ends of the fingers of the spider 86 accommodate the fusible conductors 80. Circular metal discs 96 are suitably secured to the opposite faces of the central portion of the spider 94 by a rivet 98—that rivet being telescoped through alined openings in those discs and in the central portion of the spider 94 and then being riveted over.

The spiders 86 and 94 are set so the slots in the ends of the fingers of the spider 86 accommodate those portions of the fusible conductors 80 which define the openings 85 in those fusible conductors and so the slots in the ends of the fingers of the spider 94 accommodate those portions of the fusible conductors 92 which define the openings 84 in those fusible conductors. Alloying material 87 is applied to the fusible conductors 80 adjacent that face of spider 86 which confronts the end bell 68; and that alloying material may fill the openings 85 in those fusible conductors. That alloying material will provide efficient heat transfer between those fusible conductors and that spider; and that alloying material also will be able to respond to increased temperatures to alloy with those fusible conductors and thereby cause those fusible conductors to open. Alloying material 91 is applied to the fusible conductors 92 adjacent that face of the spider 94 which confronts the end bell 74; and that alloying material may fill the openings 84 in those fusible conductors. That alloying material will provide efficient heat transfer between those fusible conductors and that spider; and that alloying material also will be able to respond to increased temperatures to alloy with those fusible conductors and thereby cause those fusible conductors to open.

A housing 99, that is similar to the housing 56, telescopes snugly over the end bells 68 and 74. That housing will be suitably secured to those end bells by fasteners, not shown, that are similar to the fasteners 62. The space defined by the housing 99 and the end bells 68 and 74 will be filled with suitable arc-quenching filler. Sealing members, shown as O-rings, are disposed within the annular recesses 70 and 76; and those sealing members will abut the inner face of the housing 99.

As indicated particularly by FIG. 9, the spiders 86 and 94 are spaced from the thermal centers of the fusible conductors 80 and 92. As pointed out previously herein, it is important that the spiders be spaced away from the thermal centers of the fusible conductors with which they are associated.

The theory of operation of the fuse 66 of FIG. 9 is generally similar to the theory of operation of the fuse 20 of FIG. 1; but the use of the two spiders 86 and 94, with their heat-absorbing masses 88 and 96, makes it possible for the fuse 66 to hold overloads for longer periods of time that can the fuse 20. However, the fuse 66 will open the circuit in which it is incorporated before an overload can cause any injury to that circuit.

As long as the current passing through the fuse 66 does not exceed the rated current of that fuse, the fusible conductors 80 and 92 will be able to carry that current indefinitely. If small, but potentially hurtful, overloads are applied to the fuse 66, the weak spots 82 will generate greater amounts of heat; but the end bells and terminals will absorb enough heat to delay the fusing of the fusible conductors. However, before such overloads could begin to become hurtful, the temperatures of the fusible conductors would rise to levels at which alloying would take place, with consequent interruption of the circuit.

If moderate overloads are applied to the fuse, the weak spots will generate still greater amounts of heat; and the rate of heat transference from the weak spots to the end bells will be too slow to enable those end bells to provide the desired delay in the fusing of the fusible conductors. That delay will, however, be provided by the masses 88 and 96, because those masses are immediately adjacent the alloying masses. The masses 88 and 96 will limit the rate, at which the temperatures of the alloying masses can rise, to such an extent that if the overload is transient in nature and passes quickly, the alloying masses 87 and 91 will not be able to rise to the point where any appreciable alloying action occurs. Depending upon the values of the overloads and depending upon the durations of the overloads, alloying action need not occur even though a succession of overloads occurs.

If a moderate overload continues for a predetermined length of time, the discs 88 and 96 will be unable to keep the temperatures of the alloying masses 87 and 91 down; and those masses will begin to alloy with the metal of the fusible conductors 80 and 92; and, very promptly, those fusible conductors will open the circuit.

If all of the fusible conductors 80 and 92 were to open at the same time, due to alloying action, no current would flow through the fingers of the spiders 86 and 94. However, the fusible conductors 80 and 92 may not all open at the same time; and, where that is the case, current will usually flow through one or more of the fingers of the spiders 86 and 94. Such current flow will heat the portions of those fingers which define the openings 89 and will promeptly cause those portions to fuse. This fusing action is desirable because it keeps the central portions of the spiders 86 and 94 and the discs 88 and 96 from being heated sufficiently to volatilize. If the metal of those discs or of the central portions of the spiders 86 and 94 were to be permitted to volatilize, sufficiently heavy pressures could be generated within the housing 99 to cause that housing to become ruptured.

In the event overloads in the short circuit range are applied to the fuse 66, the heat generated by the weak spots 82 will be generated so rapidly that there will not be time for the fingers of the spiders 86 and 94 to conduct any appreciable portion of that heat to the discs 88 and 96. Instead, the weak spots 82 will very quickly rise to their fusing temperatures and will open the circuit. In the event any arcs form between the unfused portions of the fusible conductors 80 and 92, those arcs will be unable to cause volatilization of the heat-absorbing discs 88 and 96, because those heat-absorbing discs are displaced laterally from the fusible conductors 80 and 92. As a result, there is no chance for arcs within the fuse 66 to cause volatilization of the metal of the heat-absorbing discs 88 and 96 and of the central portions of the spiders 86 and 94.

Portions of the arc-quenching filler in the fuses 20 and 66 will fuse in the event any arcs form during opening of the fusible conductors 34, 80 or 92. In fusing, that portion of the filler will absorb its heat of fusion from those arcs, and will thereby cool and quench those arcs. As a result, whenever a fuse 20 or 66 blows on short circuit, generally ellipsoidal masses of fused filler will be found surrounding the fused sections of the fusible conductors of those fuses. One such generally ellipsoidal mass of fused filler is shown in FIG. 11; and that mass is denoted by the numeral 101. That mass will coact with the unfused portions of the fusible conductor 80 and of the finger of the spider 86 to define a hollow space, all as shown by FIG. 11.

The fuses 20 and 66 can be made in different ampere ranges; but usually those fuses will be made in the range of six hundred to two thousand amperes. Where a higher ampere range is desired, a ring-like spider can be used. One such ring-like spider is shown in FIGS. 12 and 13; and that spider is denoted by the numeral 100. That spider has radially-directed, outwardly-extending fingers 103 and has radially-directed, inwardly-extending fingers 105. Slots 102 are formed in the free ends of the fingers 103 and slots 106 are formed in the free ends of the fingers 105. The slots 102 and 106 are radially-directed, as shown by FIG. 12. The spider 100 also has openings 104 and 108 therein, and those openings are comparable to the openings 46 and 89 respectively, of the spiders 42 and 86.

The ring-like spider 100 has thick metal rings 110 secured to the opposite faces thereof by rivets 112. Those thick metal rings will absorb substantial quantities of heat from the spider 100 and will thus enable that spider to absorb substantial quantities of heat from fusible conductors mounted within the slots 102 and 106. Those fusible conductors will be suitably bonded to the spider 100 by alloying material; and that spider will be spaced from the thermal masses of those fusible conductors.

For fuses in the range of two thousand to four thousand amperes, it is usually sufficient to mount fusible conductors in the slots 102 of the fingers 103. However, in ranges above four thousand amperes, fusible conductors will be mounted in the slots 106 of the fingers 105 as well as in the slots 102 of the fingers 103.

If a very high ampere range is desired, a star-like spider 114 can be used in the fuse which uses the ring-like spider 100. The spider 114 is generally similar to the spider 42; but it is shown as being able to accommodate eight fusible conductors. The spider 114 has slots 116, and has openings 118 disposed inwardly of those slots. The spider 114 has circular discs 121 secured to the central portion thereof by a rivet 119. That spider could be set in register with the ring-like spider 100, as shown, or could be set adjacent those openings in the fusible conductors which are adjacent the opposite ends of those fusible conductors. In either event, the spider 114 will be spaced from the thermal centers of those fusible conductors.

The principles and teachings of the present invention also are applicable to fuses in the ranges below six hundred amperes; and FIGS. 14–17 show one such fuse. That fuse is denoted by the numeral 120; and it has end bells 122 and 128. The end bell 122 has a flat rectangular terminal 124, has a cylindrical recess 126, and has an annular recess 127. A small cylindrical recess 123 is formed in the end bell 122, and that recess is contiguous with the recess 126. The terminal 124 extends outwardly from the left-hand face of that end bell, and the recess 126 is formed in the right-hand face of that end bell. The end bell 128 has a flat rectangular terminal 130, has a generally cylindrical recess 132, and has an annular recess 129. A small cylindrical recess 131 is formed in the end bell 128, and that recess is contiguous with the recess 132. The terminal 130 extends outwardly from the right-hand face of that end bell, and the recess 132 is formed in the left-hand face of that end bell. The recesses 126 and 132 confront each other, and they are in register with each other.

The numeral 134 denotes a spacer which is cylindrical in form and which has a reduced cross-section, central portion that gives it a spool-like configuration. A threaded socket is formed in the right-hand end of that spacer. A spider 136 which is similar in configuration to the spider 42 has an opening through the central portion thereof; and that opening is alined with the threaded socket in the spacer 134. A disc 138 has a central opening which is alined with the opening in the central portion of the spider 136 and with the threaded socket in the spacer 134; and a fastener 140, shown as a screw, telescopes through the opening in that disc and in that spider and seats in the threaded socket in the spacer 134. As a result, the fastener 140 fixedly holds the spider 136 and the disc 138 in assembled relation with the spacer 134. The spider 136 is shown as having eight fingers whereas the spider 42 has seven fingers, but the spider 136 has openings 137 which are comparable to the openings 46, and it has radially-extending slots 139 comparable to the slots 44.

The numeral 142 denotes a spacer which is substantially identical to the spacer 134. Specifically, the spacer 142 is cylindrical in configuration and has a reduced-diameter, central portion which gives that spacer a spool-like configuration. In addition, the left-hand end of the spacer 142 has a threaded socket therein. A spider 144 that is identical to the spider 136 has its central portion disposed in abutting engagement with the left-hand face of the spacer 142; and it has a circular disc 146 abutting the left-hand face of the central portion thereof. A fastener 148, shown as a screw, extends through alined openings in the disc 146 and in the spider 144 and seats in the threaded socket in the left-hand face of the spacer 142. The spider 144 has openings 145 in the fingers thereof and has slots 147 in the outer ends of those fingers.

The numeral 150 denotes a heavy metal ring which has an outer diameter smaller than the diameter of the recess 126 in the end bell 122. The numeral 152 denotes a similar ring; and the outer diameter of that ring is smaller than the diameter of the recess 132 in the end bell 128. The confronting faces of the rings 150 and 152 have slots therein, and those slots accommodate the ends of fusible conductors 154 which are similar to the fusible conductors 34. Those fusible conductors have weak spots 156 defined by central slots and inwardly-extending notches, and have openings 158 and further openings, not shown. The left-hand ends of the fusible conductors 154 extend through the slots 139 in the fingers of the spider 136 and then lodge in the slots in the right-hand face of the ring 152, and the right-hand ends of those fusible conductors extend through the slots 147 in the fingers of the spider 144 and lodge in the slots in the left-hand face of the ring 152.

High melting point solder 170 is used to secure those fusible conductors to those spiders and to those rings. While the solder 170 is shown in FIG. 17 as abutting only the left-hand face of one of the fingers of the spider 144, that solder will overlie the outer edges of the fusible conductors 154, will extend into the slots 147 in the spider 144, will extend into the slots 139 in the spider 136, and will also extend into the slots in the confronting faces of the rings 150 and 152. That solder will mechanically secure the fusible conductors 154 to the spiders 136 and 144 and to the rings 150 and 153 and will also assure good electrical and thermal contact between those fusible conductors and those spiders.

The numeral 160 denotes a spider which has a configuration that is identical to the configuration of the spiders 136 and 144—that spider having eight fingers, having slots in the ends of those fingers, and having openings in those fingers intermediate those slots and the central portion of that spider. Metal discs 162 are disposed at the opposite faces of the central portion of the spider 160, and a rivet 164 extends through alined openings in those discs and in that central portion to permanently secure those discs to that spider.

The spider 160 will be similar to the spiders 42, 86, 94, 100 and 114 in the sense that it is made of metal having a low resistivity. Thus, the spider 160 and those other spiders will usually be made of copper or silver. The spiders 136 and 144 will, however, not be made of metals having a low resistivity; and, instead, those spiders will be made of metals such as brass, Monel or the like. The higher resistivity of the metal in the spiders 136 and 144 is necessary because the fusible conductors 154 will not be able to generate sufficient heat, at low overloads, to cause the alloying action which the fusible conductors 34, 89 and 92 are able to generate in the fuses 20 and 66. The fusible conductors 154 will, of course, generate heat when the fuse 120 is subjected to overloads; and that heat will coact with the heat generated by the spiders 136 and 144 to provide the requisite alloying action.

In addition, the spacers 134 and 142 will be able to generate heat because those spacers will be made of metal which has a higher resistivity than does the metal of which the fusible conductors 154 are made. Specifically, the spacers 134 and 142 can be made of brass, Monel, or the like. The overall result is that the heat generated by the passage of current through the spacers 134 and 142 plus the heat generated by the passage of current through the spiders 136 and 144 will coact with the heat generated by the passage of current through the fusible conductors 154 to provide the requisite alloying action whenever hurtful overloads are continued for a predetermined period of time.

It will be noted that the spider 160 is spaced from the thermal centers of the fusible conductors 154, and it will be noted that the fingers of that spider engage those portions of the fusible conductors 154 which define the counterparts of the openings 158. Further, it will be noted that alloying material 168 is disposed at that face of the spider 160 which confronts the end bell 122, and that alloying material can fill the openings which are the counterparts of the openings 158.

The numeral 166 denotes a housing of insulating material which snugly telescopes over the end bells 122 and 128; and that housing fixedly holds those end bells in precisely concentric relation. That housing is secured to those end bells by fasteners, not shown; and sealing elements, such as O-rings, are disposed in the annular recesses 127 and 129 and engage the interior of the housing 166. Prior to the telescoping of the housing 166 over the end bells 122 and 128, those end bells will have the recesses 123 and 131 thereof telescoped over the outer ends of the spacers 134 and 142. In one embodiment of the present invention, those spacers are fixedly held within those recesses by high melting point solder.

In assembling the fuse 120, the fusible conductors 154 will be lodged within the slots in the fingers of the spiders 136, 144 and 160, and then the slots in the confronting faces of the rings 150 and 152 will be telescoped over the ends of those fusible conductors. At such time, the high melting point solder 170 will be used to permanently secure those fusible conductors to the spiders 136 and 144 and to the rings 150 and 152. Thereafter, the alloying material 168 will be applied to the fusible conductors 154 to provide good thermal exchange between those fusible conductors and the spider 160. Thereafter, the end bells 122 and 128 will be secured to the spacers 134 and 142; and then the housing 166 will be telescoped over those end bells and suitably secured to those end bells.

If hurtful overloads are applied to the fuse 120, the temperatures of the spacers 134 and 142 will rise, the temperatures of the spiders 136 and 144 will rise, and the temperatures at the weak spots 156 of the fusible conductors 154 will rise. A large part of the heat generated by the spacers 134 and 142 will be conducted to the end bells 122 and 128; and hence those spacers may not directly add much heat to the alloying material 168. However, the spacers 134 and 142 perform a vital function in that they keep the heat generated by the spiders 136 and 144 from being absorbed by the end bells 122 and 128.

A good part of the heat generated by the spiders 136 and 144 will be absorbed by the rings 150 and 152, and that absorbtion is desirable because it keeps the heat from the spiders 136 and 144 from initiating premature alloying action. The heat generated by the weak spots 156 of the fusible conductors 154 will flow into the adjacent portions of those fusible conductors, and a good part of the heat from the center-most weak spots 156 will be transferred by the spider 160 to the heat-absorbing discs 162. The rings 150 and 152 and the heat-absorbing discs 162 will have sufficient heat-absorbing capacity to keep the alloying material 168 from starting to alloy with the metal of the fusible conductors 154 if the overload is transient in nature and passes quickly. Depending upon the values of the overloads, and depending upon the durations of those overloads, alloying action need not occur even though a succession of overloads occurs.

If a hurtful overload continues for a predetermined length of time, the temperatures of the discs 162 and of the rings 150 and 152 will rise to the point where the temperatures of the alloying masses 168 can not be held below their alloying temperatures. At such time, those masses will begin to alloy with the metal of the fusible conductors 154; and that alloying action will, very promptly, lead to blowing of those fusible conductors.

If all of the fusible conductors 154 were to open at the same time, due to alloying action, no current would flow through the fingers of the spider 160. However, the fusible conductors 154 may not all open at the same time; and, where that is the case, current will usually flow through one or more of the fingers of the spider 160. Such current flow will heat the portions of those fingers which define the openings therein, and thereupon those portions will promptly fuse. This fusing action is desirable because it keeps the central portion of the spider 160 and the metal discs 162 from being heated sufficiently to volatilize. If the metal of those discs or of the central portion of the spider 160 were to be permitted to volatilize, sufficiently heavy pressures could be generated within the housing 166 to cause that housing to become ruptured.

In the event overloads in the short circuit range are applied to the fuse 166, the heat generated by the weak spots 156 will be generated so rapidly that there will not be time for the fingers of the spider 160 to conduct any appreciable portion of that heat to the discs 162. Instead, the weak spots 156 will very quickly rise to their fusing temperatures and will open the circuit. In the event any arcs form between the unfused portions of the fusible conductors 154, those arcs will be unable to cause volatilization of the heat-absorbing discs 162; because those heat-absorbing discs are displaced laterally from the fusible conductors 154. As a result, there is no chance for arcs within the fuse 166 to cause volatilization of the metal of the heat-absorbing discs 162 or of the central portion of the spider 160.

In the operation of the fuse 166, the spiders 136 and 144 will not fuse because they will be adjacent the coolest portions of the fusible conductors 154, namely, the ends of those fusible conductors. The primary functions of the spiders 136 and 144 are to generate heat to help initiate the alloying action of the alloying material 168 at the proper time, and to support the fusible conductors 154 relative to the spacers 134 and 142.

The amount of heat which is generated by the spiders 136 and 144 can be controlled by proper selection of the resistivity of the metal used in making those spiders. Similarly, the amount of heat generated by the spacers 134 and 142 can be regulated by selection of the resistivity of the metal used in those spacers. In addition, the amount of heat generated by the spacers 134 and 142 can be regulated by determining the diameters of the reduced-diameter, central portions of those spacers.

The amount of heat that can be absorbed by the spiders 42, 86, 94, 100, 114 and 160 can be varied by varying the conductivities and thicknesses of the heat-absorbing members attached thereto. Proper dimensioning of those heat-absorbing members will enable the fuses to hold overloads for the desired finite, predetermined lengths of time.

As indicated previously herein, it would seen logical to connect the spiders of the various fuses to the thermal centers of the fusible conductors of those fuses. However, those spiders should not be connected to the thermal centers of those fusible conductors but, instead, should be displaced from those thermal centers. Where spiders are connected to the thermal centers of fusible conductors, and where the alloying masses adjacent those spiders respond to small overloads to provide an alloying action which will lead to interruption of the circuit, it has been noted that the increase in voltage drop across the fuse, which occurs after the alloying action is initiated, is relatively slow and that the alloying action also is relatively slow. As a result, the fusible conductors can heat the fuse casing unduly before the circuit is interrupted. By displacing the spiders form the thermal centers of the fusible conductors, the present invention causes the increase in voltage drop across the fuse, which occurs after the alloying action is initiated, to be rapid and also causes the alloying action to be rapid. As a result, the displacement of the spiders from the thermal centers of the fusible conductors keeps those fusible conductors from unduly heating the fuse casing even though those fusible conductors get hot enough to open the circuit.

If desired, the openings 40 in the fusible conductors 34 could be eliminated. However, those openings are useful in securing the alloying material to those fusible conductors.

When desired, self-tapping screws could be used instead of the screws 62. Where such self-tapping screws are used, it will not be necessary to thread the sockets in the end bells 22 and 28.

Whereas the drawing and accompanying description have shown and described several preferred embodiments of the present invention it should be apparent to those skilled in the art that various changes may be made in the form of the invention without affecting the scope thereof.

What I claim is:

1. An electric fuse which comprises a massive, heat-absorbing end bell, a second masive, heat-absorbing end bell, a plurality of fusible conductors which extend between and which are connected to said massive, heat-absorbing end bells and which are connected in parallel with each other, a heat-transferring member which is connected to and which is supported by said fusible conductors, a heat-absorbing member which is secured to and which is supported by said heat-transferring member, and masses of alloying material which are on said fusible conductors and which can respond to heat to alloy with said fusible conductors and thereby cause fusing of said fusible conductors, said fusible conductors responding to overloads to generate heat, said heat-transferring member absorbing heat from said fusible conductors and transferring said heat to said heat-absorbing member, said heat-absorbing member absorbing heat from said fusible conductors via said heat-transferring member and thereby delaying the initiation of alloying action between said masses of alloying material and said fusible conductors, each of said fusible conductors having a plurality of weak spots spaced along the length thereof, said heat-transferring member being a spider having a plurality of fingers and said fingers having slots in the ends thereof that accommodate said fusible conductors, said fingers of said heat-transferring member being connected to said fusible conductors at points spaced from the thermal centers of said fusible conductors, said fingers of said heat-transferring member being spaced from the adjacent massive, heat-absorbing end bell by weak spots of said fusible conductors, said fingers of said heat-transferring member having weak spots which are intermediate said fusible conductors and said heat-absorbing member and which will fuse if said fingers have to carry the rated current of said fuse, said masses of alloying material being secured to said fusible conductors adjacent those faces of said fingers of said heat-transferring member which are remote from said thermal centers of said fusible conductors, said heat-absorbing member being a disc that abuts the geometric center of said heat-transferring member, said heat-transferring member spacing said heat-absorbing member from said fusible conductors so said heat-absorbing member can not be volatilized by arcing when said fusible conductors fuse, said fingers of said heat-transferring member being secured to said fusible conductors adjacent weak spots of said fusible conductors.

2. An electric fuse which comprises a heat-absorbing member, a second heat-absorbing member, a plurality of fusible conductors which extend between and which are connected to said heat-absorbing members and which are connected in parallel with each other, a heat-transferring member which is connected to and which is supported by said fusible conductors, a third heat-absorbing member which is secured to and which is supported by said heat-transferring member, and masses of alloying material which are on said fusible conductors and which can respond to heat to alloy with said fusible conductors and thereby cause fusing of said fusible conductors, said heat-transferring member absorbing heat from said fusible conductors and transferring said heat to said third heat-absorbing member, said third heat-absorbing member absorbing heat from said fusible conductors via said heat-transferring member and thereby delaying the initiation of alloying action between said masses of alloying material and said fusible conductors, said heat-transferring member being a spider having a plurality of fingers and said fingers having slots in the ends thereof that accommodate said fusible conductors, said fingers of said heat-transferring member being connected to said fusible conductors at points spaced from the thermal centers of said fusible conductors, said fingers of said heat-transferring member having weak spots which are intermediate said fusible conductors and said third heat-absorbing member and which will fuse if said fingers have to carry the rated current of said fuse, said masses of alloying material being secured to said fusible conductors adjacent those faces of said fingers of said heat-transferring member which are remote from said thermal centers of said fusible conductors, said heat-transferring member spacing said third heat-absorbing member from said fusible conductors so said third heat-absorbing member can not be volatilized by arcing when said fusible conductors fuse.

3. An electric fuse which comprises a heat-absorbing member, a second heat-absorbing member, a plurality of fusible conductors which extend between and which are connected to said heat-absorbing members and which are connected in parallel with each other, a heat-transferring member which is connected to and which is supported by said fusible conductors, a third heat-absorbing member which is secured to and which is supported by said heat-transferring member, and masses of alloying material which are on said fusible conductors and which can respond to heat to alloy with said fusible conductors and thereby cause fusing of said fusible conductors, said heat-transferring member absorbing heat from said fusible conductors and transferring said heat to said third heat-absorbing member, said third heat-absorbing member absorbing heat from said fusible conductors via said heat-transferring member and thereby delaying the initiation of alloying action between said masses of alloying material and said fusible conductors, said heat-transferring member being a spider having a plurality of fingers, said fingers of said heat-transferring member being connected to said fusible conductors at points spaced from the thermal centers of said fusible conductors, said fingers of said heat-transferring member having weak spots which are intermediate said fusible conductors and said third heat-absorbing member and which will fuse if said fingers have to carry the rated current of said fuse, said heat-transferring member spacing said third heat-absorbing member from said fusible conductors so said third heat-absorbing member can not be volatilized by arcing when said fusible conductors fuse.

4. An electric fuse which comprises a heat-absorbing member, a second heat-absorbing member, a plurality of fusible conductors which extend between and which are connected to said heat-absorbing members and which are connected in parallel with each other, a metal heat-transferring member which is connected to and which is supported by said fusible conductors, a third heat-absorbing member which is secured to and which is supported by said heat-transferring member, and masses of alloying material which are on said fusible conductors and which can respond to heat to alloy with said fusible conductors and thereby cause fusing of said fusible conductors, said heat-transferring member absorbing heat from said fusible conductors and transferring said heat to said third heat-absorbing member, said heat-transferring member being a spider having a plurality of fingers, said fingers of said heat-transferring member being laterally-directed of said fusible conductors and having large surface-to-volume ratios for those portions thereof which are intermediate said fusible conductors and said third heat-absorbing member whereby said portions of said fingers can radiate heat and thereby increase the ability of said heat-transferring member to absorb heat from said fusible conductors, said fingers of said heat-transferring member being connected to said fusible conductors at points spaced from the thermal centers of said fusible conductors, said masses of alloying material being secured to said fusible conductors adjacent those faces of said fingers of said heat-transferring member which are remote from said thermal centers of said fusible conductors, said heat-transferring member spacing said third heat-absorbing member from said fusible conductors so said third heat-absorbing member can not be volatilized by arcing when said fusible conductors fuse.

5. An electric fuse which comprises a heat-absorbing member, a second heat-absorbing member, a fusible conductor which is connected to said heat-absorbing members, a metal heat-transferring member connected to said fusible conductor, a third heat-absorbing member secured to said heat-transferring member, and a mass of alloying material on said fusible conductor that can respond to heat to alloy with said fusible conductor, said heat-transferring member transferring heat from said fusible conductor to said third heat-absorbing member, said heat-transferring member being laterally-directed of said fusible conductor and having a large surface-to-volume ratio for that portion thereof which is intermediate said fusible conductor and said third heat-absorbing member whereby said portion can radiate heat and thereby increase the ability of said heat-transferring member to absorb heat from said fusible conductor, said third heat-absorbing member absorbing heat from said fusible conductor via said heat-transferring member and thereby delaying the initiation of alloying action between said mass of alloying material and said fusible conductor, said heat-transferring member spacing said third heat-absorbing member from said fusible conductor so said third heat-absorbing member can not be volatilized by arcing of said fusible conductor when said fusible conductor fuses.

6. An electric fuse which comprises a heat-absorbing member, a second heat-absorbing member, a fusible conductor which is connected to said heat-absorbing members, a heat-transferring member connected to said fusible conductor, said heat-transferring member being connected to said fusible conductor at a point spaced from the thermal center of said fusible conductor, a third heat-absorbing member secured to said heat-transferring member, and a mass of alloying material on said fusible conductor that can respond to heat to alloy with said fusible conductor, said heat-transferring member being laterally-directed of said fusible conductor and being adapted to radiate heat and thereby increase the ability of said heat-transferring member to absorb heat from said fusible conductor, said mass of alloying material being secured to said fusible conductor adjacent that face of said heat-transferring member which is remote from said thermal center of said fusible conductor, said third heat-absorbing member absorbing heat from said fusible conductor via said heat-transferring member and thereby delaying the initiation of alloying action between said mass of alloying material and said fusible conductor.

7. An electric fuse which comprises terminals, a fusible conductor that is electrically connected to said terminals and that normally holds said terminals in electrically-conducting relation, a heat-absorbing member that is spaced laterally from said fusible conductor, and a metal heat-transferring member that is connected to said fusible conductor and to said heat-absorbing member and that will transfer heat from said fusible conductor to said heat-absorbing member, said heat-transferring member being laterally-directed of said fusible conductor, said heat-transferring member having a portion thereof intermediate said fusible conductor and said heat-absorbing member that will fuse whenever it carries the rated current of said electric fuse, the spacing of said heat-absorbing member from said fusible conductor isolating said heat-absorbing member from any arcs that might form when said fusible conductor interrupts said electrically-conducting relation, said fusible conductor being adapted to respond to overloads of predetermined size and duration to interrupt said electrically-conducting relation, said heat-transferring member being adapted to delay the interruption of said electrically-conducting relation by said fusible conductor by transferring heat from said fusible conductor to said heat-absorbing member, said heat-transferring member normally carrying substantially no current, said portion of said heat-transferring member responding to any interruption of said electrically-conducting relation which causes said heat-transferring member to carry the rated current of said fuse to fuse.

8. An electric fuse which comprises terminals, a fusible conductor that is electrically connected to said terminals and that normally holds said terminals in electrically-conducting relation, a heat-absorbing member that is spaced from said fusible conductor, a metal heat-transferring member that is connected to said fusible conductor and to said heat-absorbing member and that will transfer heat from said fusible conductor to said heat-absorbing member, and alloying material adjacent the connection between said fusible conductor and said heat-transferring member that can respond to heat to alloy with said fusible conductor, said heat-transferring member being laterally-directed of said fusible conductor and being adapted to radiate heat and thereby increase the ability of said heat-transferring member to absorb heat from said fusible conductor, said heat-transferring member and said heat-absorbing member being adapted to limit the rate at which the temperature of said alloying material can rise.

9. An electric fuse which comprises terminals, a fusible conductor that is electrically connected to said terminals and that normally holds said terminals in electrically-conducting relation, a heat-absorbing member that is spaced from said fusible conductor, a metal heat-transferring member that is connected to said fusible conductor and to said heat-absorbing member and that will transfer heat from said fusible conductor to said heat-absorbing member, and alloying material adjacent the connection between said fusible conductor and said heat-transferring member that can respond to heat to alloy with said fusible conductor, said heat-transferring member being laterally-directed of said fusible conductor, said heat-transferring member and said heat-absorbing member being adapted to limit the rate at which the temperature of said alloying material can rise, said heat-transferring member being connected to said fusible conductor at a point spaced from the thermal center of said fusible conductor, said alloying material being applied to said fusible conductor adjacent that side of said heat-transferring member which is remote from said thermal center of said fusible conductor.

10. An electric fuse which comprises a heat-absorbing member, a second heat-absorbing member, a fusible conductor which is connected to said heat-absorbing members, a metal heat-transferring member connected to said fusible conductor, a third heat-absorbing member secured to said heat-transferring member, and a mass of alloying material on said fusible conductor that can respond to heat to alloy with said fusible conductor, said fusible conductor responding to overloads to generate heat, said heat-transferring member transferring heat from said fusible conductor to said third heat-absorbing member, said heat-transferring member having a large surface-to-volume portion intermediate said fusible conductor and said heat-absorbing member so said heat-transferring member can radiate heat and thereby absorb addiitonal heat from said fusible conductor, said third heat-absorbing member absorbing heat from said fusible conductor via said heat-transferring member and thereby delaying the initiation of alloying action between said mass of alloying material and said fusible conductor.

11. An electric fuse which comprises a heat-absorbing member, a second heat-absorbing member, a fusible conductor which is connected to said heat-absorbing members, said fusible conductor having an opening therein, a metal heat-transferring member connected to said fusible conductor adjacent said opening, a third heat-absorbing member secured to said heat-transferring member, and a mass of alloying material on said fusible conductor that can respond to heat to alloy with said fusible conductor, said mass of alloying material engaging said heat-transferring member and said fusible conductor and at least partially filling said opening and providing efficient heat exchange between said heat-transferring member and said fusible conductor, said heat-transferring member being laterally-directed of said fusible conductor, said third heat-absorbing member absorbing heat from said fusible conductor via said heat-transferring member and thereby delaying the initiation of alloying action between said mass of alloying material and said fusible conductor.

12. An electric fuse which comprises a heat-absorbing member, a second heat-absorbing member, a fusible conductor which is connected to said heat-absorbing members, a metal heat-transferring member connected to said fusible conductor, a third heat-absorbing member secured to said heat-transferring member, and a mass of alloying material on said fusible conductor that can respond to heat to alloy with said fusible conductor, said heat-transferring member being laterally-directed of said fusible conductor and having a large surface-to-volume ratio for that portion thereof which is intermediate said fusible conductor and said third heat-absorbing member whereby said portion can radiate heat and thereby increase the ability of said heat-transferring member to absorb heat from said fusible conductor, said heat-transferring member transferring heat from said fusible conductor to said third heat-absorbing member, said mass of alloying material engaging said heat-transferring member and said fusible conductor and providing efficient heat exchange between said heat-transferring member and said fusible conductor.

13. An electric fuse which comprises a heat-absorbing member, a second heat-absorbing member, fusible conductors which are connected to said heat-absorbing members and which are connected in parallel with each other, a heat-transferring member connected to said fusible conductors, a third heat-absorbing member secured to said heat-transferring member, masses of alloying material on said fusible conductors, said fusible conductors responding to overloads to generate heat, said heat-transferring member transferring heat from said fusible conductors to said third heat-absorbing member, said third heat-absorbing member delaying the initiation of alloying action between said masses of alloying material and said fusible conductor, a heat-generating member secured to the first said heat-absorbing member, a second heat-generating member secured to said second heat-absorbing member, end bells for said fuse, a third heat-generating member disposed between one of said end bells and the first said heat-generating member to keep the heat from the first said heat-generating member from being absorbed by said one end bell, a fourth heat-generating member that is disposed between the other end bell and said second heat-generating member to keep the heat from said second heat-generating member from being absorbed by said other end bell.

14. An electric fuse which comprises a heat-absorbing member, a second heat-absorbing member, fusible conductors which are connected to said heat-absorbing members and which are connected in parallel with each other, a heat-transferring member connected to said fusible conductors, a third heat-absorbing member secured to said heat-transferring member, masses of alloying material on said fusible conductors, said fusible conductors responding to overloads to generate heat, said heat-transferring member transferring heat from said fusible conductors to said third heat-absorbing member, said third heat-absorbing member delaying the initiation of alloying action between said masses of alloying material and said fusible conductor, a heat-generating member secured to the first said heat-absorbing member, a second heat-generating member secured to said second heat-absorbing member, end bells for said fuse, a third heat-generating member disposed between one of said end bells and the first said heat-generating member to keep the heat from the first said heat-generating member from being absorbed by said one end bell, a fourth heat-generating member that is disposed between the other end bell and said second heat-generating member to keep the heat from said second heat-generating member from being absorbed by said other end bell, said third and said fourth heat-generating members adding substantially no heat directly to said masses of alloying material but, instead, predominantly serving to prevent absorption of said end bells of the heat generated by the first said and said second heat-generating members.

15. An electric fuse which comprises a heat-absorbing member, a second heat-absorbing member, fusible conductors which are connected to said heat-absorbing members and which are connected in parallel with each other, a heat-transferring member connected to said fusible conductors, a third heat-absorbing member secured to said heat-transferring member, masses of alloying material on said fusible conductors, said fusible conductors responding to overloads to generate heat, said heat-transferring member transferring heat from said fusible conductors to said third heat-absorbing member, said third heat-absorbing member delaying the initiation of alloying action between said masses of alloying material and said fusible conductor, a heat-generating member secured to the first said heat-absorbing member, a second heat-generating member secured to said second heat-absorbing member, end bells for said fuse, a third heat-generating member disposed between one of said end bells and the first said heat-generating member to keep the heat from the first said heat-generating member from being absorbed by said one end bell, a fourth heat-generating member that is disposed between the other end bell and said second heat-generating member to keep the heat from said second heat-generating member from being absorbed by said other end bell, the first said and said second heat-absorbing members being rings supported by the first said and said second heat-generating members.

16. An electric fuse which comprises a heat-absorbing member, a second heat-absorbing member, fusible conductors which are connected to said heat-absorbing members and which are connected in parallel with each other, a heat-transferring member connected to said fusible conductors, a third heat-absorbing member secured to said heat-transferring member, masses of alloying material on said fusible conductors, said fusible conductors responding to overloads to generate heat, said heat-transferring member transferring heat from said fusible conductors to said third heat-absorbing member, said third heat-absorbing member delaying the initiation of alloying action between said masses of alloying material and said fusible conductor, a heat-generating member secured to the first said heat-absorbing member, a second heat-generating member secured to said second heat-absorbing member, end bells for said fuse, a third heat-generating member disposed between one of said end bells and the first said heat-generating member to keep the heat from the first said heat-generating member from being absorbed by said one end bell, a fourth heat-generating member that is disposed between the other end bell and said second heat-generating member to keep the heat from said second heat-generating member from being absorbed by said other end bell, said third and said fourth heat-generating members being cylindrical in configuration and having reduced-diameter portions.

17. An electric fuse which has end bells, fusible conductors, a pair of heat-generating members that are disposed adjacent said end bells, spacers that are secured to said end bells and to said heat-generating members and that are themselves heat-generating members, a heat-transferring member that is secured to said fusible conductors and that supports a heat-absorbing member, and heat-absorbing members adjacent the junctions between said fusible conductors and the first said heat-generating members, said end bells absorbing heat from said spacers, the first said heat-absorber absorbing heat from said heat-transferring member and thus from said fusible conductors, and the other heat-absorbing members absorbing heat from the first said heat-generating members.

18. An electric fuse which has end bells, fusible conductors, a pair of heat-generating members that are disposed adjacent said end bells, spacers that are secured to said end bells and to said heat-generating members and a heat-transferring member that is secured to said fusible conductors and that supports a heat-absorbing member, said end bells absorbing heat from said spacers, and said heat-absorber absorbing heat from said heat-transferring member and thus from said fusible conductors, said heat-transferring member spacing said heat-absorbing member from said fusible conductors so said heat-absorbing member can not be volatilized by arcing when said fusible conductors fuse.

References Cited in the file of this patent

UNITED STATES PATENTS

| | | |
|---|---|---|
| 1,140,953 | Cole | May 23, 1915 |
| 2,300,620 | Duerkob | Nov. 3, 1942 |
| 2,386,094 | Duerkob | Oct. 2, 1945 |
| 2,605,371 | Fahnoe | July 29, 1952 |
| 2,658,974 | Kozacka | Nov. 10, 1953 |
| 2,688,061 | Kozacka | Aug. 31, 1954 |
| 2,810,042 | Lear | Oct. 15, 1957 |
| 2,871,314 | Swan et al. | Jan. 27, 1959 |
| 2,892,060 | Gaskill | June 23, 1959 |